(12) United States Patent
Pickens

(10) Patent No.: US 10,935,452 B2
(45) Date of Patent: Mar. 2, 2021

(54) COMPONENT INSPECTION USING MEASURED AND THEORETICAL MOMENT WEIGHTS

(71) Applicant: United Technologies Corporation, Farmington, CT (US)

(72) Inventor: John T. Pickens, Wethersfield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 179 days.

(21) Appl. No.: 16/213,200

(22) Filed: Dec. 7, 2018

(65) Prior Publication Data

US 2020/0182730 A1    Jun. 11, 2020

(51) Int. Cl.
*G01M 1/10* (2006.01)
*G01M 1/12* (2006.01)
*G01M 15/14* (2006.01)

(52) U.S. Cl.
CPC ............ *G01M 1/10* (2013.01); *G01M 1/122* (2013.01); *G01M 15/14* (2013.01)

(58) Field of Classification Search
CPC ........... G01M 15/14; G01M 1/22; G01M 1/10
USPC ....................................................... 73/65.01
See application file for complete search history.

(56) References Cited

U.S. PATENT DOCUMENTS

| 5,187,976 A | * | 2/1993 | Gossler | ................... G01M 1/10 177/245 |
| 5,195,363 A | | 3/1993 | Gossler | |
| 8,069,707 B2 | | 12/2011 | Tragesser et al. | |
| 10,161,261 B2 | * | 12/2018 | Ehsani | ................... F01D 21/003 |
| 2011/0314909 A1 | * | 12/2011 | Harrison | ................... F01D 5/027 73/455 |

FOREIGN PATENT DOCUMENTS

GB           2185116 A       2/1986

OTHER PUBLICATIONS

EP search report for EP19214615.7 dated Apr. 2, 2020.

* cited by examiner

*Primary Examiner* — Nimeshkumar D Patel
*Assistant Examiner* — Jean F Morello
(74) *Attorney, Agent, or Firm* — Getz Balich LLC

(57) ABSTRACT

A method is provided for inspecting a component. During this method, a theoretical moment weight of the component is determined. The theoretical moment weight of the component is compared to a measured moment weight of the component to determine a difference between the theoretical moment weight of the component and the measured moment weight of the component. A fault notification is provided where the difference between the theoretical moment weight of the component and the measured moment weight of the component is greater than a predetermined value.

18 Claims, 4 Drawing Sheets

COMPONENT INSPECTION USING MEASURED AND THEORETICAL MOMENT WEIGHTS

BACKGROUND OF THE DISCLOSURE

1. Technical Field

This disclosure relates to inspection of a component such as, for example, a gas turbine engine rotor blade.

2. Background Information

Various systems and methods are known in the art for component inspections. While these systems and methods have various benefits, there is still room in the art for improvement.

SUMMARY OF THE DISCLOSURE

According to an aspect of the present disclosure, a method is provided for inspecting a component. During this method, a theoretical moment weight of the component is determined. The theoretical moment weight of the component is compared to a measured moment weight of the component to determine a difference between the theoretical moment weight of the component and the measured moment weight of the component. A fault notification is provided where the difference between the theoretical moment weight of the component and the measured moment weight of the component is greater than a predetermined value.

According to another aspect of the present disclosure, a method is provided for inspecting a rotor blade of a turbine engine, the rotor blade manufactured according to a design model. During this method, a theoretical moment weight of the rotor blade is compared to a measured moment weight of the rotor blade to determine a difference between the theoretical moment weight of the rotor blade and the measured moment weight of the rotor blade. The theoretical moment weight of the rotor blade is determined based on a measured weight of the rotor blade and a theoretical center of gravity distance of the rotor blade obtainable from the design model. A fault notification is provided where the difference between the theoretical moment weight of the rotor blade and the measured moment weight of the rotor blade is outside a predetermined range.

According to still another aspect of the present disclosure, a method is provided for inspecting a rotor blade of a turbine engine. During this method, a theoretical radial moment weight of the rotor blade is compared to a measured radial moment weight of the rotor blade to determine a difference between the theoretical radial moment weight of the rotor blade and the measured radial moment weight of the rotor blade. A notification is provided where the difference between the theoretical radial moment weight of the rotor blade and the measured radial moment weight of the rotor blade is greater than a predetermined absolute value that is equal to or less than five percent of theoretical radial moment weight of the rotor blade.

The theoretical moment weight of the component may be determined based on a measured parameter of the component.

The theoretical moment weight of the component may be determined based on a measured weight of the component and a theoretical center of gravity distance of the component.

During the method, the theoretical center of gravity distance of the component may be obtained from a design model used for manufacture of the component.

The predetermined value may be an absolute value.

The absolute value may be equal to or less than two percent of the theoretical moment weight of the component.

The theoretical moment weight of the component may be a theoretical radial moment weight of the component. The measured moment weight of the component may be a measured radial moment weight of the component.

During the method, the component may be removed from a supply chain where the fault notification is provided.

The component may be configured as a component of a turbine engine.

The component may be configured as a rotor blade.

The component may be configured as a fan blade.

The predetermined range may be between plus two percent of the theoretical moment weight of the rotor blade and minus two percent of the theoretical moment weight of the rotor blade.

The theoretical moment weight of the rotor blade may be a theoretical radial moment weight of the rotor blade. The measured moment weight of the rotor blade may be a measured radial moment weight of the rotor blade.

During the method, the rotor blade may be removed from a supply chain where the fault notification is provided.

The rotor blade may be configured as a fan blade.

The theoretical radial moment weight of the rotor blade may be determined by multiplying a measured weight of the rotor blade by a theoretical radial center of gravity distance of the rotor blade.

The rotor blade may be manufactured according to a design model, and the theoretical radial center of gravity distance of the rotor blade may be obtainable from the design model.

During the method, a second notification may be provided where the difference between the theoretical radial moment weight of the rotor blade and the measured radial moment weight of the rotor blade is less than or equal to the predetermined absolute value.

The foregoing features and the operation of the invention will become more apparent in light of the following description and the accompanying drawings.

DETAILED DESCRIPTION

Figure 1:
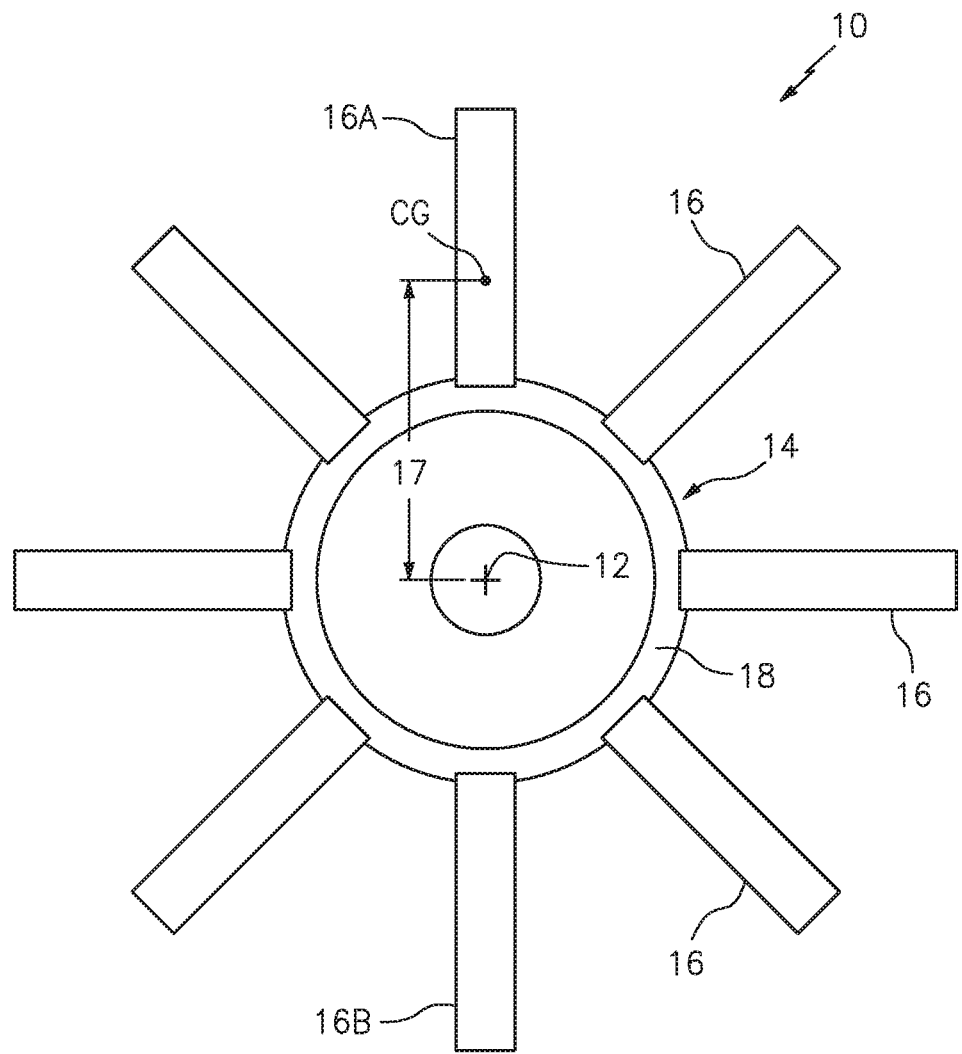
FIG. 1 is a schematic illustration of a rotor.

FIG. 1 is a schematic illustration of a rotor 10 for an apparatus such as, but not limited to, a turbine engine. This rotor 10 is rotatable about a rotational axis 12. The rotor 10 includes a rotor disk 14 and an array of rotor blades 16 arranged circumferentially around and connected to a hub 18 of the rotor disk 14.

To reduce vibrations, rotor wobble and/or other detrimental dynamic responses during rotation of the rotor 10, the rotor 10 may be balanced using known rotor balancing techniques. One such rotor balancing technique may determine placement of the individual rotor blades 16 based on associated rotor blade moment weights. The rotor blades 16 may be assigned locations about the rotor disk 14, for example, such that the combined moment weights of the rotor blades 16, once properly located about and connected to the hub 18, cancel each other out; e.g., substantially zero out. For example, a first rotor blade 16A may be diametrically located relative to a second rotor blade 16B where those rotor blades 16A and 16B have substantially equal, but opposite acting, moment weights subsequent to being connected to the rotor disk 14.

The moment weight of a rotor blade may be measured by a moment weight measurement device. Various such moment weight measurement devices are known in the art and, thus, are not discussed below in further detail. After moment weight measurement, the moment weight may be handwritten or printed onto the rotor blade and/or otherwise communicated with and/or assigned to the rotor blade such that the measured moment weight may be used for subsequent rotor balancing as described above. However, measurement error caused by, for example, improper fixturing of the rotor blade with the moment weight measurement device and/or transcription error may lead to associating a rotor blade with an inaccurate measured moment weight. As a result, the rotor may be unbalanced and require time consuming and costly downstream investigation, such as re-measurement of each rotor blade moment weight and re-balancing.

Figure 2:
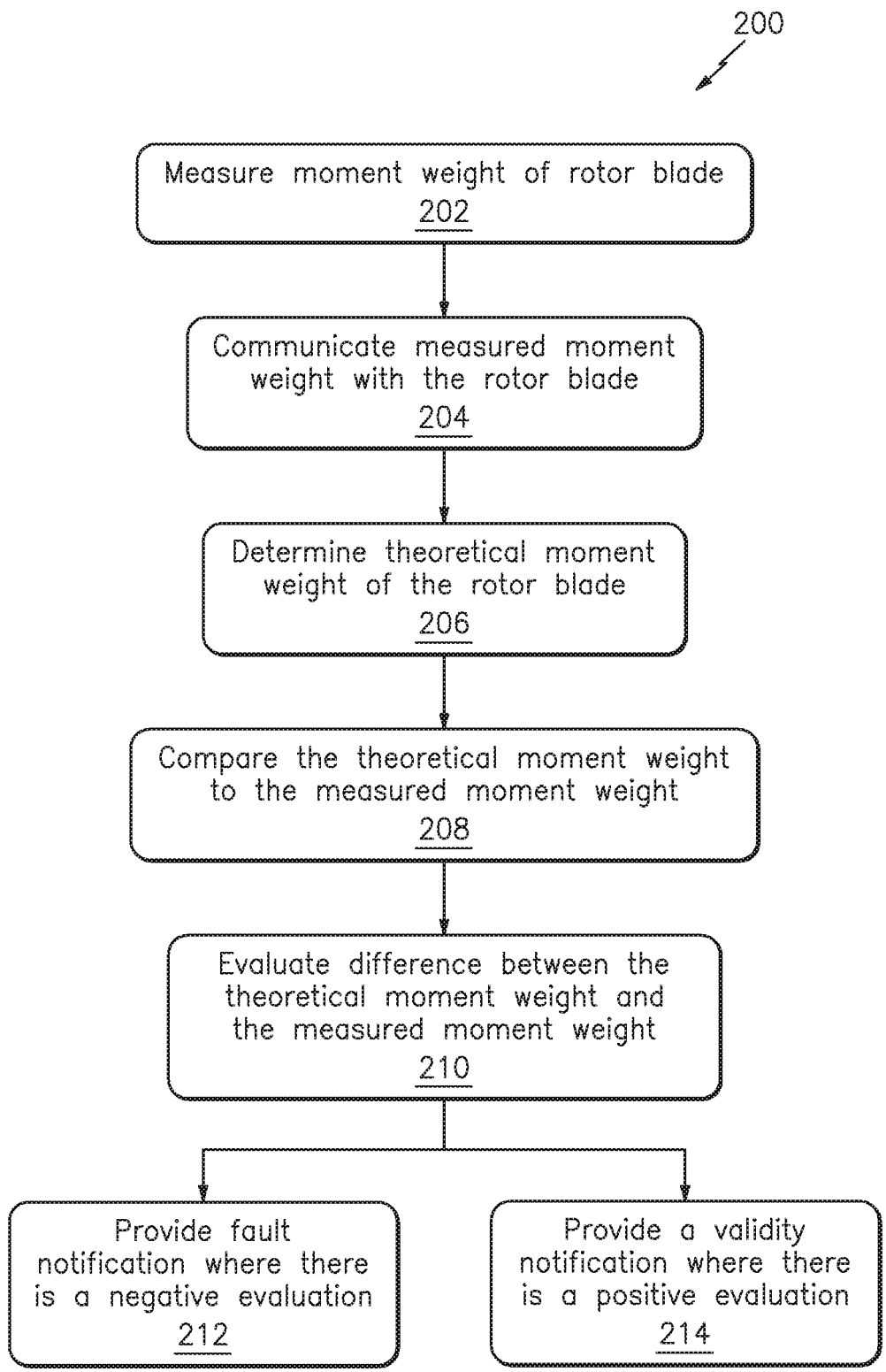
FIG. 2 is a flow diagram of a method for inspecting a rotor blade.

Referring to FIG. 2, in order to catch and flag an inaccurate measured and/or communicated moment weight prior to rotor 10 balancing, a method 200 may be performed for inspecting a rotor blade 16 subsequent to moment weight measurement but prior to the rotor 10 balancing. While this method 200 is described below with reference to inspecting a rotor blade 16, this method 200 may also or alternatively be performed to inspect various other rotating and non-rotating components other than rotor blades or components in rotational equipment such as a turbine engine. Furthermore, while the method 200 is described below as inspecting a single rotor blade, the steps of the method 200 may be iteratively repeated for one or more additional rotor blades such that each rotor blade for a rotor is inspected.

In step 202, a moment weight of the rotor blade 16 is measured. This measured moment weight may be obtained using a moment weight measurement device.

In step 204, the measured moment weight is communicated with/assigned to the rotor blade 16. The measured moment weight, for example, may be handwritten or printed onto the rotor blade 16. The measured moment weight may also or alternatively be provided on packaging material (e.g., a box or crate) for the rotor blade 16. The measured moment weight may still also or alternatively be electronically associated with the rotor blade 16; e.g., a rotor blade serial number may be electronically linked with the measured moment weight. The present disclosure, of course, is not limited to the foregoing exemplary techniques for communicating/assigning the measured moment weight of a rotor blade.

In step 206, a theoretical moment weight of the rotor blade 16 is determined. This theoretical moment weight may be determined based on (at least or only) a measured parameter of the rotor blade 16 and a theoretical parameter associated with the rotor blade 16. The theoretical moment weight, for example, may be determined by multiplying a measured weight (e.g., actual/pan weight) of the rotor blade 16 by a theoretical center of gravity (CG) distance of the rotor blade 16. Herein, the term "center of gravity distance" may describe a distance (e.g., distance 17 of FIG. 1) between a rotational axis (e.g., the rotational axis 12) and a center of gravity point of an object (e.g., the rotor blade 16). The theoretical center of gravity distance may be obtained from a design model (e.g., a three-dimensional (3D) computer aided design (CAD) model) used for the manufacture of the rotor blade 16.

In step 208, the theoretical moment weight of the rotor blade 16 is compared to the measured moment weight that is communicated by step 204. During this comparison, a difference between the theoretical moment weight and the communicated measured moment weight is determined.

In step 210, the difference between the theoretical moment weight and the communicated measured moment weight is evaluated. For example, the difference between the theoretical moment weight and the communicated measured moment weight may be compared to a predetermined range to determine if a value of the difference is within or outside of the predetermined range. This predetermined range may be between at least plus/positive five percent (e.g., two percent) of the theoretical moment weight and at least minus/negative five percent (e.g., two percent) of the theoretical moment weight; i.e., between +/−5%, or more particularly between +/−2%, of the theoretical moment weight. Alternatively, the difference between the theoretical moment weight and the communicated measured moment weight may be compared to a predetermined value to determine if a value (e.g., an absolute value) of the difference is greater than, equal to or less than the predetermined value This predetermined value may be equal to or less than five percent (e.g., equal to or less than two percent) of the theoretical moment weight of the rotor blade 16. The present disclosure, of course, is not limited to the foregoing exemplary predetermined ranges or values.

In step 212, a fault notification is provided based on a negative evaluation during the step 210. For example, where the value of the difference between the theoretical moment weight and the communicated measured moment weight is outside of the predetermined range, the fault notification may be provided. In another example, where the value (e.g., the absolute value) of the difference between the theoretical moment weight and the communicated measured moment weight is greater than the predetermined value, the fault notification may be provided. This fault notification may be any notification capable of visually and/or audibly flagging (e.g., identifying) that the communicated measured moment weight associated with the rotor blade 16 being inspected is incorrect or otherwise needs to be reevaluated. Examples of a fault notification include, but are not limited to, a fault (e.g., red or yellow) light illuminated from an indicator light or a display screen, an audible tone produced by a speaker, etc. The present disclosure, of course, is not limited to the foregoing exemplary fault notifications.

In step 214, a validity notification is provided based on a positive evaluation during the step 210. For examples, where the value of the difference between the theoretical moment weight and the communicated measured moment weight is within of the predetermined range (which may include the endpoints), the validity notification may be provided. In another example, where the value (e.g., the absolute value) of the difference between the theoretical moment weight and the communicated measured moment weight is equal to or less than the predetermined value, the validity notification may be provided. This validity notification may be any notification capable of visually and/or audibly flagging (e.g., identifying) that the communicated measured moment weight associated with the rotor blade 16 being inspected is correct and/or within tolerance. Examples of a validity notification include, but are not limited to, a validity (e.g., green) light illuminated from an indicator light or a display screen, an audible tone produced by a speaker, etc. The present disclosure, of course, is not limited to the foregoing exemplary validity notifications.

Where a fault notification is provided, the rotor blade 16 may be removed from a supply chain such that that rotor blade 16 and its associated measured moment weight is not used in a subsequent rotor balancing operation. Rather, the rotor blade 16 may be marked/sent for shipment back to a supplier, for another inspection and/or for remeasurement of the moment weight. However, where a validity notification is provided, the rotor blade 16 may continue down the supply chain for rotor 10 balancing and/or other manufacturing/assembly operations.

One or more or any combination of the steps 202, 204, 206, 208, 210, 212, 214 and/or 216 may be electronically performed by or using a computer. This computer may be implemented with a combination of hardware and software. The hardware may include memory and at least one processing device, which may include one or more single-core and/or multi-core processors. The hardware may also or alternatively include analog and/or digital circuitry other than that described above. The memory may be configured to store software (e.g., program instructions) for execution by the processing device, which software execution may control and/or facilitate performance of one or more operations such as those described in the method 200 above. The memory may be a non-transitory computer readable medium. For example, the memory may be configured as or include a volatile memory and/or a nonvolatile memory.

Figure 3A:
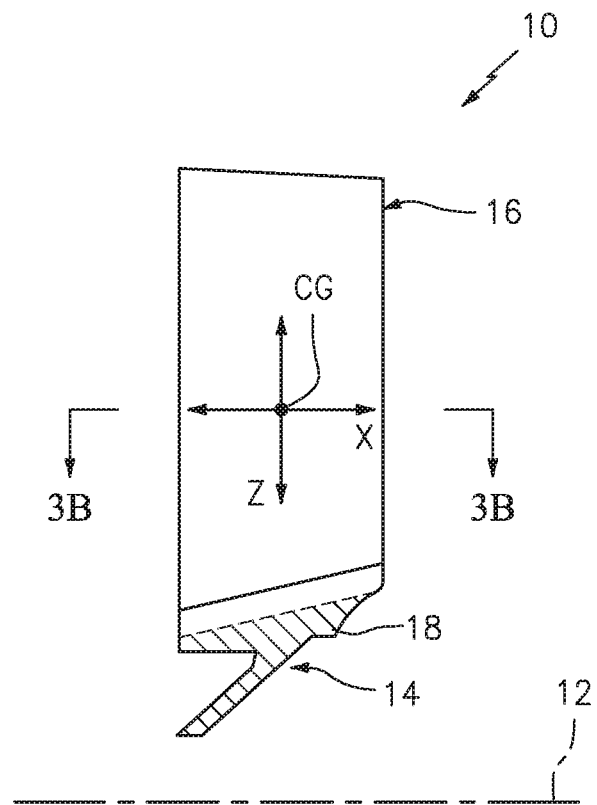
FIG. 3A is a partial side sectional illustration of the rotor of FIG. 1.
Figure 3B:
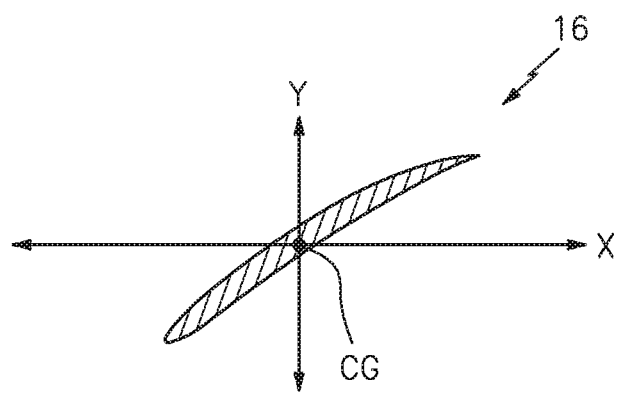
FIG. 3B is a cross-sectional illustration of the rotor blade of FIG. 3A taken along line 3B-3B.

Referring to FIGS. 3A and 3B, a moment weight of a rotor blade 16 may be categorized into three components: an axial moment weight (e.g., along x-axis); a tangential moment weight (e.g., along y-axis); and a radial moment weight (e.g., along z-axis). The axial moment weight is measured along the rotational axis 12 of the rotor 10. The tangential moment weight is measured in a direction than is tangent to a circle around the axis 12. The radial moment weight is measure along a ray projecting out from the rotational axis 12 of the rotor 10. The method 200 above may be performed for all three components of the moment weight. Alternatively, the method 200 may be performed for a single one (or select two) of the three components of the moment weight. For example, in some embodiments, the measured moment weight of the step 202 may be a measured radial moment weight and the theoretical moment weight of the step 206 may be a theoretical radial moment weight. In such embodiments, the theoretical center of gravity distance multiplied by the measured weight in the step 206 may be a theoretical radial center of gravity distance.

The inventor of the present disclosure has discovered that a radial moment weight of a rotor blade is typically significantly larger than an axial or a tangential moment weight of the same rotor blade. Therefore, focusing the inspection on the radial moment weight may reduce complexity of the method 200 while still providing accurate results.

In some embodiments, an engine manufacture may provide the design model to a supplier to manufacture the rotor blades 16. The supplier may manufacture the rotor blades 16 according to the design model. The supplier may also measure the moment weights and actual (e.g., pan) weights of the rotor blades 16 and communicate those measured weights to the engine manufacture upon delivery of the rotor blades 16. The engine manufacture may then determine the theoretical moments weights of the rotor blades 16 to evaluate whether the communicated measured moment weights of the receive blades are within tolerance. Alternatively, the evaluation may be performed by the supplier as a double check prior to shipment of the rotor blades 16 to the engine manufacture. The present disclosure, of course, is not limited to any particular party performing any one or more steps of the disclosed inspection methods.

The rotor blade 16 inspected during the method 200 may be any type of rotor blade included in a turbine engine. The rotor blade 16, for example, may be configured as a fan blade, a compressor blade or a turbine blade.

Figure 4:
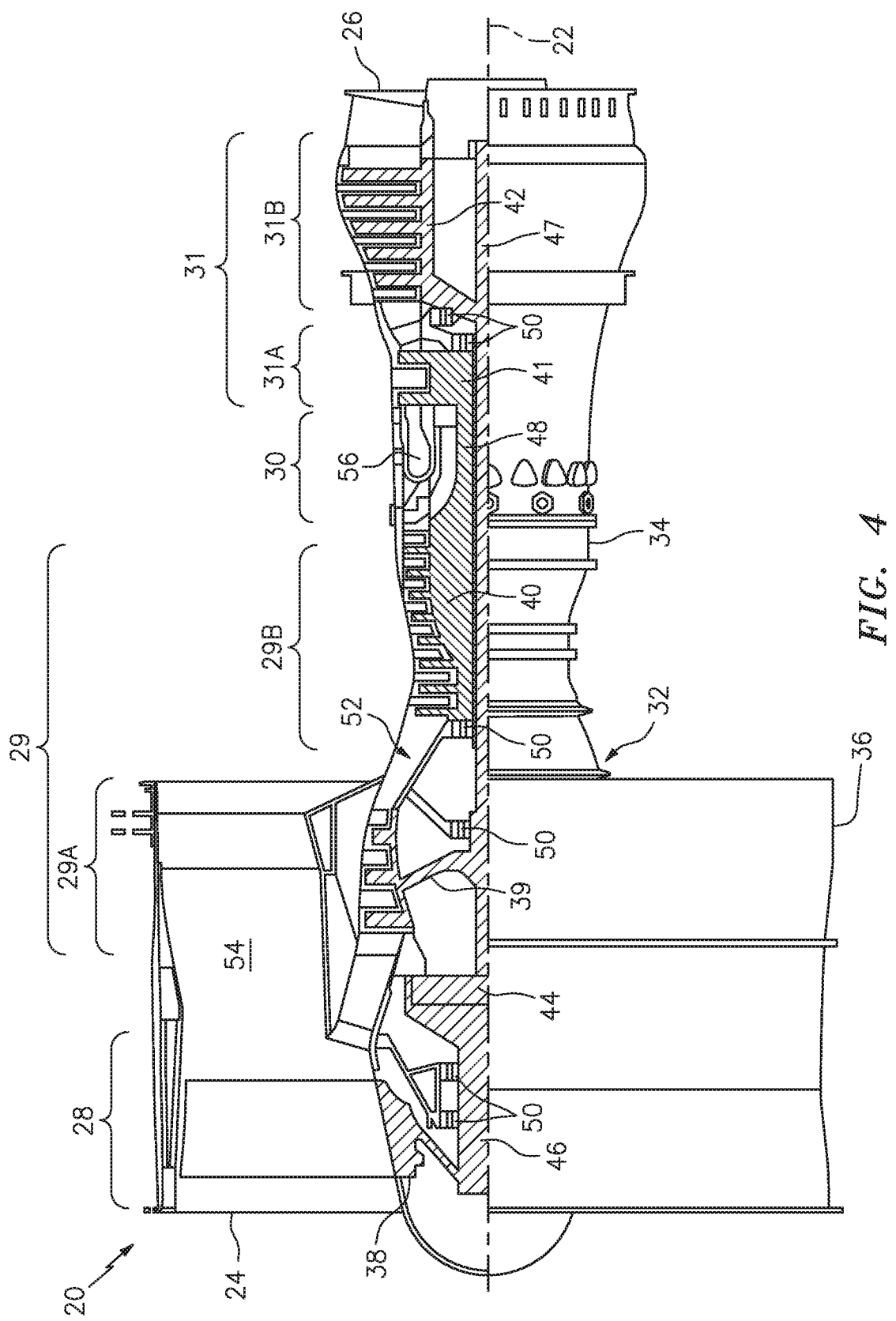
FIG. 4 is a partial side cutaway illustration of a geared turbofan turbine engine.

FIG. 4 is a side cutaway illustration of a geared turbine engine 20 in which the rotor blade 16 inspected during the method 200, or rotor blades 16 inspected during iterations of the method 200 may be included. This turbine engine 20 extends along an axial centerline 22, which may be coaxial with the rotational axis 12 (see FIG. 1), between an upstream airflow inlet 24 and a downstream airflow exhaust 26. The turbine engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B.

The engine sections 28-31 are arranged sequentially along the centerline 22 within an engine housing 32. This housing 32 includes an inner case 34 (e.g., a core case) and an outer case 36 (e.g., a fan case). The inner case 34 may house one or more of the engine sections 29A-31B; e.g., an engine core. The outer case 36 may house at least the fan section 28.

Each of the engine sections 28, 29A, 29B, 31A and 31B includes a respective rotor 38-42; e.g., see FIG. 1. Each of these rotors 38-42 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 38 is connected to a gear train 44, for example, through a fan shaft 46. The gear train 44 and the LPC rotor 39 are connected to and driven by the LPT rotor 42 through a low speed shaft 47. The HPC rotor 40 is connected to and driven by the HPT rotor 41 through a high speed shaft 48. The shafts 46-48 are rotatably supported by a plurality of bearings 50; e.g., rolling element and/or thrust bearings. Each of these bearings 50 is connected to the engine housing 32 by at least one stationary structure such as, for example, an annular support strut.

During operation, air enters the turbine engine 20 through the airflow inlet 24. This air is directed through the fan section 28 and into a core gas path 52 and a bypass gas path 54. The core gas path 52 extends sequentially through the engine sections 29A-31B. The air within the core gas path 52 may be referred to as "core air". The bypass gas path 54 extends through a bypass duct, which bypasses the engine core. The air within the bypass gas path 54 may be referred to as "bypass air".

The core air is compressed by the compressor rotors 39 and 40 and directed into a combustion chamber 56 of a combustor in the combustor section 30. Fuel is injected into the combustion chamber 56 and mixed with the compressed core air to provide a fuel-air mixture. This fuel air mixture is ignited and combustion products thereof flow through and sequentially cause the turbine rotors 41 and 42 to rotate. The rotation of the turbine rotors 41 and 42 respectively drive rotation of the compressor rotors 40 and 39 and, thus, compression of the air received from a core airflow inlet. The rotation of the turbine rotor 40 also drives rotation of the fan rotor 38, which propels bypass air through and out of the bypass gas path 54. The propulsion of the bypass air may account for a majority of thrust generated by the turbine engine, e.g., more than seventy-five percent (75%) of engine thrust. The turbine engine of the present disclosure, however, is not limited to the foregoing exemplary thrust ratio.

The rotor 10 and its rotor blades 16 may be included in various turbine engines other than the one described above as well as in other types of rotational equipment. The rotor 10 and its rotor blades 16, for example, may be included in a geared turbine engine where a gear train connects one or more shafts to one or more rotors in a fan section, a compressor section and/or any other engine section. Alternatively, the rotor 10 and its rotor blades 16 may be included in a turbine engine configured without a gear train. The rotor 10 and its rotor blades 16 may be included in a geared or non-geared turbine engine configured with a single spool, with two spools (e.g., see FIG. 1), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method for inspecting a component, the method comprising:
   determining a theoretical moment weight of the component;
   comparing the theoretical moment weight of the component to a measured moment weight of the component to determine a difference between the theoretical moment weight of the component and the measured moment weight of the component; and
   providing a fault notification where the difference between the theoretical moment weight of the component and the measured moment weight of the component is greater than a predetermined value;
   wherein the theoretical moment weight of the component is determined based on a measured parameter of the component.

2. The method of claim 1, wherein
   the measured parameter of the component comprises a measured weight of the component; and
   the theoretical moment weight of the component is determined based on lithe measured weight of the component and a theoretical center of gravity distance of the component.

3. The method of claim 2, further comprising obtaining the theoretical center of gravity distance of the component from a design model used for manufacture of the component.

4. The method of claim 1, wherein the predetermined value is an absolute value.

5. The method of claim 4, wherein the absolute value is equal to or less than two percent of the theoretical moment weight of the component.

6. The method of claim 1, wherein
   the theoretical moment weight of the component is a theoretical radial moment weight of the component; and
   the measured moment weight of the component is a measured radial moment weight of the component.

7. The method of claim 1, further comprising removing the component from a supply chain where the fault notification is provided.

8. The method of claim 1, wherein the component is configured as a component of a turbine engine.

9. The method of claim 1, wherein the component is configured as a rotor blade.

10. The method of claim 1, wherein the component is configured as a fan blade.

11. A method for inspecting a rotor blade of a turbine engine, the rotor blade manufactured according to a design model, the method comprising:
    comparing a theoretical moment weight of the rotor blade to a measured moment weight of the rotor blade to determine a difference between the theoretical moment weight of the rotor blade and the measured moment weight of the rotor blade, wherein the theoretical moment weight of the rotor blade is determined based on a measured weight of the rotor blade and a theoretical center of gravity distance of the rotor blade obtainable from the design model; and
    providing a fault notification where the difference between the theoretical moment weight of the rotor blade and the measured moment weight of the rotor blade is outside a predetermined range.

12. The method of claim 11, wherein the predetermined range is between plus two percent of the theoretical moment weight of the rotor blade and minus two percent of the theoretical moment weight of the rotor blade.

13. The method of claim 11, wherein
    the theoretical moment weight of the rotor blade is a theoretical radial moment weight of the rotor blade; and
    the measured moment weight of the rotor blade is a measured radial moment weight of the rotor blade.

14. The method of claim 11, further comprising removing the rotor blade from a supply chain where the fault notification is provided.

15. The method of claim 11, wherein the rotor blade is configured as a fan blade.

16. A method for inspecting a rotor blade of a turbine engine, the method comprising:
    comparing a theoretical radial moment weight of the rotor blade to a measured radial moment weight of the rotor blade to determine a difference between the theoretical radial moment weight of the rotor blade and the measured radial moment weight of the rotor blade; and
    providing a notification where the difference between the theoretical radial moment weight of the rotor blade and the measured radial moment weight of the rotor blade is greater than a predetermined absolute value that is equal to or less than five percent of theoretical radial moment weight of the rotor blade;
    wherein the theoretical radial moment weight of the rotor blade is determined by multiplying a measured weight of the rotor blade by a theoretical radial center of gravity distance of the rotor blade.

17. The method of claim 16, wherein the rotor blade is manufactured according to a design model, and the theoretical radial center of gravity distance of the rotor blade is obtainable from the design model.

18. The method of claim 16, further comprising providing a second notification where the difference between the theoretical radial moment weight of the rotor blade and the measured radial moment weight of the rotor blade is less than or equal to the predetermined absolute value.

* * * * *

UNITED STATES PATENT AND TRADEMARK OFFICE
CERTIFICATE OF CORRECTION

PATENT NO. : 10,935,452 B2  
APPLICATION NO. : 16/213200  
DATED : March 2, 2021  
INVENTOR(S) : Pickens Page 1 of 1

It is certified that error appears in the above-identified patent and that said Letters Patent is hereby corrected as shown below:

Column 7, Line 61, please delete "lithe" and insert --the--

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*